Oct. 11, 1966     L. E. MADANSKY     3,278,740
ILLUMINATING APPARATUS
Filed March 2, 1964
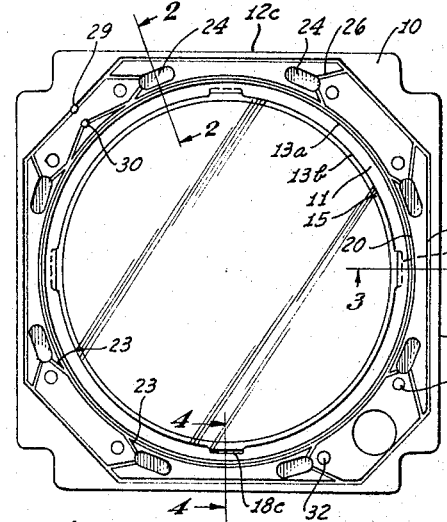
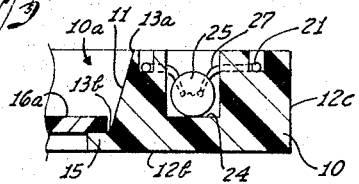
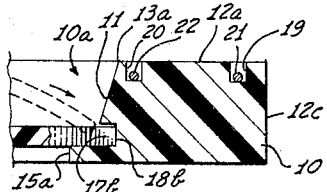
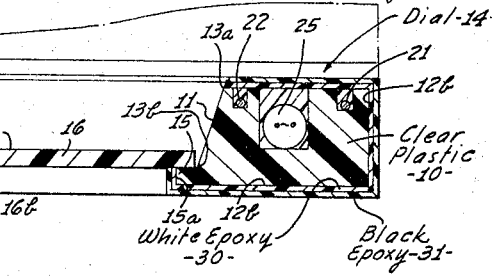
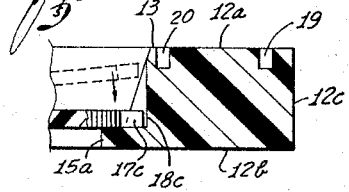
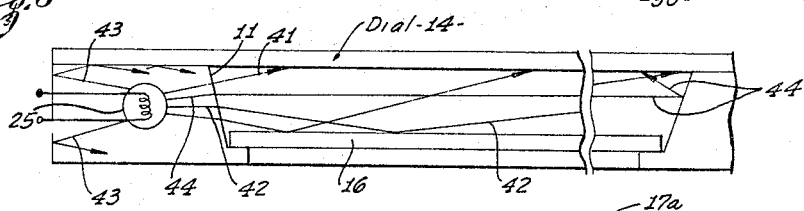
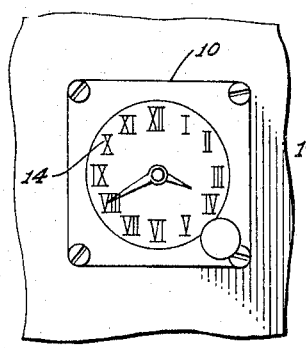
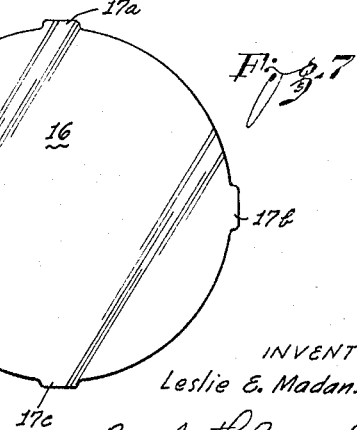
INVENTOR
Leslie E. Madansky
By Smyth, Roston & Pavitt
Attorneys United States Patent Office 3,278,740
Patented Oct. 11, 1966

3,278,740
ILLUMINATING APPARATUS
Leslie E. Madansky, Burbank, Calif., assignor to California Plasteck, Inc., Reseda, Calif., a corporation of California
Filed Mar. 2, 1964, Ser. No. 348,511
3 Claims. (Cl. 240—2.1)

The present invention relates to an illuminating device for illuminating instrument dials.

The illumination of instrument dials presents specific problems in that laterally disposed lamps or the like rarely produce an homogenous illuminating field nor is the entire dial area illuminated evenly. A truly even illumination of dials was heretofore possible only when using transparent dials and illuminating them from the rear. This mode of illumination, however, is rarely possible because the dial itself usually covers instrument parts so that there is no place for such an illuminating device in the rear of the dial.

It is an object of the present invention to provide a new and improved dial illuminating device producing an even illuminating field for the dial.

It is another object of the present invention to provide a novel illuminating attachment for a dial to be illuminated.

It is a further object of the present invention to produce a new article of manufacture constituting a light chamber capable of circumscribing a limited area and illuminating same laterally.

According to one aspect of the present invention in a preferred embodiment thereof, it is suggested to provide a flat and transparent supporting member having a central aperture. This aperture may be circular if the dial to be illuminated is a circular disc; this being the most common type of dial. However, the aperture does not have to be circular, and the main requirement is that the aperture follow the contour of the dial to be illuminated. The aperture is defined by an oblique or tapered wall of this transparent member. Accordingly, at the dial-side surface of this flat member, the central aperture defines an opening that is larger than the corresponding and concentrical opening at the opposite surface thereof. There may be a rim provided around and at the tapered window wall and running along the latter, smaller opening in the surface of the member opposite to the dial-side surface thereof. The oblique wall circumscribing the dial defines a window which is partially directed and oriented towards the dial, but principally it is oriented towards the center of the dial.

The transparent base member is provided with several grooves, channels and cavities or parts preferably substantially regularly arranged around the window wall. There are light bulbs received in the cavities, and by means of a transparent mass the light bulbs are potted into the cavities. The channels in the transparent base member receive wires for connecting all of the bulbs in parallel. These wires are also potted. Two wire stubs or fingers project outwardly from the member for making electrical connection at external terminals. A glass plate is seated on the above-mentioned rim, which glass plate has at least one flat surface for specular reflection and facing the dial. With the exception of the window wall circumscribing the dial, the transparent member is covered with an opaque, reflecting layer, so that the member defines a light drop or chamber and light may leave this chamber only through the window wall. In case the dial is a circular disc, the window wall will be of frusto-conical shape, the wider end thereof is juxtaposed to the dial.

The invention, however, has utility for all types of dials to be illuminated, and no particular shape for such dial is required.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 illustrates a rear view of the base member of the inventive illuminating device;

FIG. 2 illustrates a cross-sectional and enlarged view taken in plane 2—2 of FIG. 1 which plane runs through a cavity housing a light bulb;

FIG. 3 illustrates a cross-sectional and enlarged view taken in plane 3—3 in FIG. 1;

FIG. 4 illustrates a cross-sectional and enlarged view through the member taken in plane 4—4 of FIG. 1;

FIG. 5 illustrates a cross-sectional view through a portion of a complete dial illuminating device including the base member as illustrated in FIGS. 1 through 4;

FIG. 6 illustrates schematically several paths of the light rays developed in the illuminating device shown in FIGS. 1 through 5;

FIG. 7 illustrates a transparent reflecting plate cooperating with a member such as illustrated in FIGS. 1 through 5; and, FIG. 8 illustrates a plan view of a clock with a dial illuminating device as shown in the preceding figures.

Proceeding now to the detailed description of the drawing, the novel base member 10 for a dial illuminating device shall be described first. This base member 10 consists of a clear and transparent plastic material; it may be made of an integral stamped piece, and it includes, supports and houses all elements necessary for illuminating a dial.

The member 10 has a substantially square-shaped outer configuration; it has a rear face 12a, a front face 12b and a peripheral surface 12c. Furthermore, member 10 has a disc-like aperture 10a defined by an annular, tapered or frusto-conical wall 11. This aperture 10a is of disc-shaped configuration because it is to accommodate an annular dial. Accordingly, the rear face 12a of member 10 has a circular inner edge 13a defining an opening and directly circumscribed the scale on a dial 14, which is to be illuminated. The front face 12b of member 10 has a concentrical opening that is extended inwardly by a rim 15, the inner annular or cylindrical circumference 15a of which defines the smallest opening of this aperture 10a of member 10. The rim 15 extends from the lower margin 13b of wall 11, thereby defining a seat to support a glass plate 16 which glass plate is illustrated by itself in FIG. 7.

Plate 16 has a first surface 16a which is flat so as to permit specular reflection. When plate 16 is seated on rim 15, the surface 16a is oriented to face the dial 14. The outer surface 16b of plate 16 may be flat and may extend parallel to surface 16a. However, if an overall or a local optical enlargement is desired, surface 16b may be provided with convexly curved portions. The glass plate 16 has four lugs 17a, 17b, 17c and 17d. Three of these lugs are received in undercut portions below the tapered wall 11. FIG. 3 illustrates such an undercut portion defining a pocket 18b to receive, for example, the lug 17b.

For mounting, it can be seen that the glass plate 16 is bent at first, and the lugs such as 17b are being slid into pockets such as 18b. These other lugs are received in corresponding pockets. In order to facilitate the assembly, one of the lugs such as, for example, 17c can be directly placed onto a widened rim portion defined by a recessed niche 18c in the inner wall 11; this is specifically illustrated in FIG. 4. Plate 16 may then be glued onto rim 15.

The rear or dial-side face 12a of member 10 is further provided with two grooves such as 19 and 20. The groove 19 extends substantially close to the outer margin of the member 10 and defines a continuous channel. The inner groove 20 is substantially circular thus defining an annular channel extending very close to and circumscribing the edge 13a. There is a dimpled portion of groove 20 at one corner to reduce the distance from groove 19 at that particular spot. Electrical conductors such as thin wires 21 and 22 are respectively received in the grooves 19 and 20.

There are further provided connecting grooves such as 23 extending somewhat outwardly from the inner annular groove 20, and they terminate in somewhat oval pits or cavities such as 24. The oval cavities or pits 24 house small light bulbs 25. There are altogether eight such pits 24, and accordingly there are eight connecting grooves 23 for connecting the pits 24 with channel 20. The grooves 23 receive electrical conductor or wire studs for connecting one terminal each of a light bulb 25 in a pit 24 with the wire 20.

There are eight connecting grooves 26 carved or stamped in the member 10. These grooves 26 extend somewhat inwardly to connect the channel 19 with pits 24, there is one such groove 26 for each pit or cavity 24. The connecting grooves 26 receive wires, such as 27 to connect the wire 21 in channel 19 with the respective other terminal of the light bulbs 25.

It will thus be appreciated that the eight light bulbs 25 are connected in parallel and in between the two endless wires 21 and 22. Two wire stubs or fingers 29 and 30 extend transversely to the plane of the drawing of FIG. 1 and they penetrate the plane defined by the rear face 12a of member 10. These wire fingers 29 and 30 serve to connect an external source of electrical energy to the wires 21 and 22 and to all of the eight light bulbs 25, thus providing them with electrical power.

The pits 24 are deeper than the channels and grooves because these pits have to be sufficiently deep so that the light bulbs 25 and particularly the filaments thereof are positioned in about the middle between the rear end front faces 12a and 12b of member 10. Channels and grooves should not be too deep since they would tend to weaken the structure. Additionally, wires in deep channels would somewhat obscure the light paths between bulbs 25 and window 11.

After the bulbs such as 25 are all positioned in their respective cavities and pits 24, and after all wires have been placed into their respective channels and grooves, and after suitable electrical connections have been made, the remaining space of the pits, channels and grooves is filled with, for example, a clear epoxy. In other words, the electrical circuit elements are being potted by a transparent medium in channels, grooves and pits as provided in the transparent member 10.

After potting, the member 10 including the exposed portions of the potting material is covered with, for example, a layer 30 of white epoxy; however, the wall 11 is not covered and thus defines a frusto-conical window. The cover thus provided has as its primary purpose that it will not absorb light. It is immaterial whether such layer or cover 30 produces a specular or a diffused white or glossy reflection. Thus, the layer such as 30 can be made of white epoxy or of a metal silvery deposit. Use of white epoxy is more economical than silvering, and it suffices for the purposes of the present invention. The layer 30 will additionally be covered with layer 31, for example, black epoxy. This layer 31 will provide for sufficient contrast to the illuminated dial, it will further light tightly close member 10, and finally, the black epoxy will protect the reflecting layer 30.

There are provided holes such as 32 for receiving bolts, screws or the like in order to secure the dial 14 to the member 10 (or vice versa) after the illuminating device has been assembled, potted and covered as above described. The holes 32 are also covered at their insides with the double layers 30 and 31.

It appears that the member 10 together with the layers 30 and 31 define an annular, light or illuminating chamber of refracting material permitting the emission of light only through the tapered or frusto-conical window wall 11. The light leaving this window wall 11 is in effect the principal illuminating source for the dial 14.

Turning now to FIG. 6, the illuminating effect produced by the invention device shall be explained more fully with reference to several light ray paths illustrated therein. A light source such as a bulb 25 emits light in all directions. Rays such as 41, of course, do directly illuminate the dial 14 since such rays leave the window 11 substantially perpendicular thereto. The light rays such as 42 are emitted in a direction which is substantially parallel to the extension of dial 14 or they are directed at a small angle towards the glass plate 16. These light rays leave window 11 at an angle so that they will be refracted by this window 11. The refraction is a slight one, and it results in a large angle of incidence measured relative to the vertical of the inner surface 16a of the plate 16.

According to Fresnel's law, a considerable portion of light rays impinging upon the surface of an optically denser but substantially transparent material is being reflected by such surface, provided the angle of incidence is close to 90°. A light beam impinging on such surface in the range between 75 and 90° angle of incidence, is being reflected to above 80%. The precise portion that is reflected depends on the index of refraction and varies with the angle. Theoretically, there is 100% reflection at 90° angle of incidence. For this reason, no semi-transparent or semi-mirroring layer is required on the plate 16 for practicing the invention. It should be mentioned, however, that of course a semi-transparent, reflecting layer on plate 16 will aid in the illumination of the dial. However, the inner surface 16a of glass plate 16 itself can already be regarded as a semi-reflector, with or without semi-reflecting layer, simply by virtue of the large angle of incidence.

It will be appreciated that light such as the rays 43 emitted by the light bulb 25 in any other direction will be reflected by the inside of cover 30. The reflection may be specular or diffuse, but in any event, such reflected light will contribute further to the illumination of the dial, because almost all light leaving the window 11 will always have a direction that is predominantly parallel to dial 14 and plate 16 or only slightly inclined thereto. The dial 14 is illuminated either directly or illumination results from reflection of plate 16 and at a high angle of incidence to the vertical on the inner surface of the plate 16.

Some of the light rays inside of member 10, such as rays 44, are directed at a small angle towards dial 14. Such rays leave window 11 so as to travel towards the opposite portion of window wall 11. The light is then reflected by this portion of window wall 11 and strikes dial 14.

It appears that most of the light rays leaving a light bulb 25, are reflected or directed by the light chamber in a direction substantially parallel to the dial 14 or towards the dial 14, or, when being directed slightly away therefrom, such light will be reflected by the plate 16 towards the dial. The tapering of window 11 produces a fanned-out effect by the reflected light rays. Light rays leaving window 11 at slightly different directions are being reflected by remotely positioned and spaced apart areas of plate surface 16a so that the dial is being illuminated by these reflected light rays very uniformly.

The light rays as illustrated in FIG. 6, of course, have additionally components extending perpendicularly to the plane of the drawing or symmetrically therefor. The circular window wall 11 with its frusto-conical configuration and the light bulbs 25 circumscribing this window cooperate with all the inner reflecting surfaces of the member 10 such as the circumferential surface 12c or the front face 12b so that an even distribution of the light is attained.

If this window 11 is slightly frosted, the light distribution is evened additionally.

It should be observed that the schematic view illustrated in FIG. 6 is incomplete in that diametrically across the opening the aperture is defined by window 11, there is positioned, in fact, another light bulb producing a similar fanned-out beam illuminating the dial from the other side.

The covered surfaces 12a, 12b and 12c thus define a light chamber reflecting the light emitted by the light bulbs 25 in such a manner that a substantially flat and uniform beam leaves annular window 11 in a radial, inward direction; a substantial portion of the light produced by the bulbs 25 contributes to the illumination of the dial 14 either directly, or after reflection at the walls of the light chamber. The dial itself reflects the illuminated light diffusely, so that most such light from the dial now passes at a small angle of incidence through plate 16.

A very small portion of the light reaching plate 16 from dial 14 is reflected again by the surface 16a. However, no loss in effective illumination is being incurred thereby, because this latter reflection is directed towards the dial and contributes further to the illumination thereof. Thus, most of the light leaving the light chamber through the external plate surface 16b originally contributed to the illumination of the dial. It has been found that a very uniform overall illumination of the dial results from the cooperative effect of these inventive provisions.

It should be mentioned that in order to practice the invention, it is possible to make the support member 10 and the plate 16 as an integral part. However, it has been found to be of advantage to use a material of slightly different index of refraction for the plate 16 and the member 10. It has also been found that the best material used for member 10 is a clear plastic capable of being molded and stamped whereas the plate 16 preferably is made of Plexiglas.

The member 10 with all potted electrical first circuit elements can be used as a self-contained attachment to fit over already installed or completely assembled instruments with dials. An illuminating device for a dial of about 2 inches in diameter will be about 3/16 inch thick. These dimensions illustrate that the illuminating light beam leaving window 11 strikes the surface 16a at an angle of incidence close to 90°. The apex angle of the cone developing the frusto-conical window 11 will be in a range including about 1/2 to 2/3 of the light angle.

The invention is not limited to the embodiments described above, but all changes and modifications thereof not constituting departures from the spirit and scope of the invention are intended to be covered by the following claims.

What is claimed is:
1. A dial illuminating device, comprising:
 a flat transparent member having a dial-side surface and a surface opposite thereto, said member further having an oblique, continuous window wall defining an aperture, said window wall having an edge contiguous with said dial-side surface and defining a first contour line following the contour of the dial to be illuminated, the surface of said member opposite to said dial-side surface having an edge along the aperture and defining a second contour line substantially concentrically to said first contour line but enclosing a smaller area than said first contour line;
 a reflecting and opaque layer on said member covering its surfaces except said window wall;
 means in said member defining a plurality of pits and being arranged around said window wall;
 means defining a first and a second continuous channel in said member;
 and means defining branch channels individually interconnecting each of said pits with each of said first and said second continuous channels;
 light bulbs positioned in said cavities; electrical connecting wires positioned in said channels for connecting all of said light bulbs in parallel;
 a transparent mass for embedding said light bulbs in said cavity and said wires in said channels; and
 a plane parallel glass plate mounted at said opposite surface of said member.

2. A dial illuminating device comprising:
 a flat transparent member having a dial-side surface and a surface opposite thereto, said member further having an oblique, continuous window wall defining a first opening following the contour of the dial to be illuminated, said window wall of said member further defining a second opening in the surface of said member extending opposite to said dial-side surface, said second opening being substantially concentrically to said first opening and enclosing a smaller area than said first opening;
 a reflecting and opaque layer on said member covering its surfaces except said window wall;
 means in said member defining a plurality of cavities and being arranged around said window wall;
 means defining a first and a second continuous channel in said member;
 means defining branch channels individually interconnecting each of said cavities with each of said first and said second continuous channels;
 light bulbs embedded in said cavities, each bulb having two connecting terminals;
 a first and a second wire respectively embedded in said first and said second continuous channel;
 wires embedded in said branch channels and respectively interconnecting the two electrical terminals of each light bulb with said first and said second wires in said first and said second continuous channels; and
 a plane parallel transparent plate mounted adjacent said second contour line.

3. A dial illuminating device as set forth in claim 2, said transparent member being provided with outwardly extending lugs, said member having undercut portions at said window wall for receiving said lugs, there being an annular rim at said second opening for seating said transparent member.

References Cited by the Examiner

UNITED STATES PATENTS

| | | | |
|---|---|---|---|
| 2,172,765 | 9/1939 | Kollsman | 240—2.1 |
| 2,703,547 | 3/1955 | Hardesty | 116—129 |
| 2,804,540 | 8/1957 | Columbus et al. | 240—8.16 |
| 2,839,670 | 6/1958 | Gladstone | 240—1 X |
| 2,891,141 | 6/1959 | Lancucki et al. | 240—8.16 |
| 3,120,349 | 2/1964 | Howland | 240—1 X |
| 3,120,350 | 2/1964 | Muenz | 40—130 X |

FOREIGN PATENTS

| | | |
|---|---|---|
| 801,526 | 9/1958 | Great Britain. |
| 838,431 | 6/1960 | Great Britain. |

NORTON ANSHER, *Primary Examiner.*

J. F. PETERS, *Assistant Examiner.*